Aug. 20, 1963

A. LORENZ 3,100,997

DIAPHRAGM VACUUM GAUGE

Filed Aug. 7, 1961

INVENTOR.
ALBERT LORENZ

United States Patent Office 3,100,997
Patented Aug. 20, 1963

3,100,997
DIAPHRAGM VACUUM GAUGE
Albert Lorenz, Hanau am Main, Germany, assignor to W. C. Heraeus G.m.b.H., Hanau am Main, Germany, a corporation of Germany
Filed Aug. 7, 1961, Ser. No. 129,895
Claims priority, application Germany Aug. 18, 1960
2 Claims. (Cl. 73—388)

The present invention relates to a diaphragm vacuum gauge for measuring very low pressures.

There are various designs of diaphragm vacuum gauges known in the art. If they are of a proper construction, their pressure indications are very reliable. Many efforts have therefore been made to increase the measuring range of such gauges so as to indicate lower pressures, and there have been numerous proposals of devices for indicating very small diaphragm movements by combinations of mechanical and electrical or optical transmitting means, for example, in the form of mirrors which are associated with light indicators.

It is an object of the present invention to provide a diaphragm vacuum gauge for indicating very small diaphragm movements by extremely simple electrooptical means.

The invention consists in positively connecting the diaphragm of this gauge to a partly transparent screen so that the latter will carry out the same movements as the diaphragm and will thereby move parallel to a similar second screen which is mounted in a fixed position. The apparatus according to the invention further comprises optical means of a type known as such for passing different amounts of light through the two screens in accordance with their change in transparency when they are moved relative to each other by the different pressures acting upon the diaphragm. The light transmitted through the screens is then utilized for indicating the respective pressure acting upon the diaphagram.

A very advantageous feature of the present invention resides in its extremely simple construction which is attained by completely enclosing the actual vacuum gauge by means of a glass cover and by mounting the light-producing means and the means for measuring the light which is transmitted through the screens in a position outside of the glass cover where they are under normal atmospheric pressure.

The objects, features, and advantages of the present invention will become more clearly apparent from the following detailed description thereof which is to be read with reference to the accompanying drawings, in which FIGURE 1 shows a cross section of a diaphragm vacuum gauge according to the invention;

FIGURE 3 shows a front view of a modified screen; while

Figure 1:
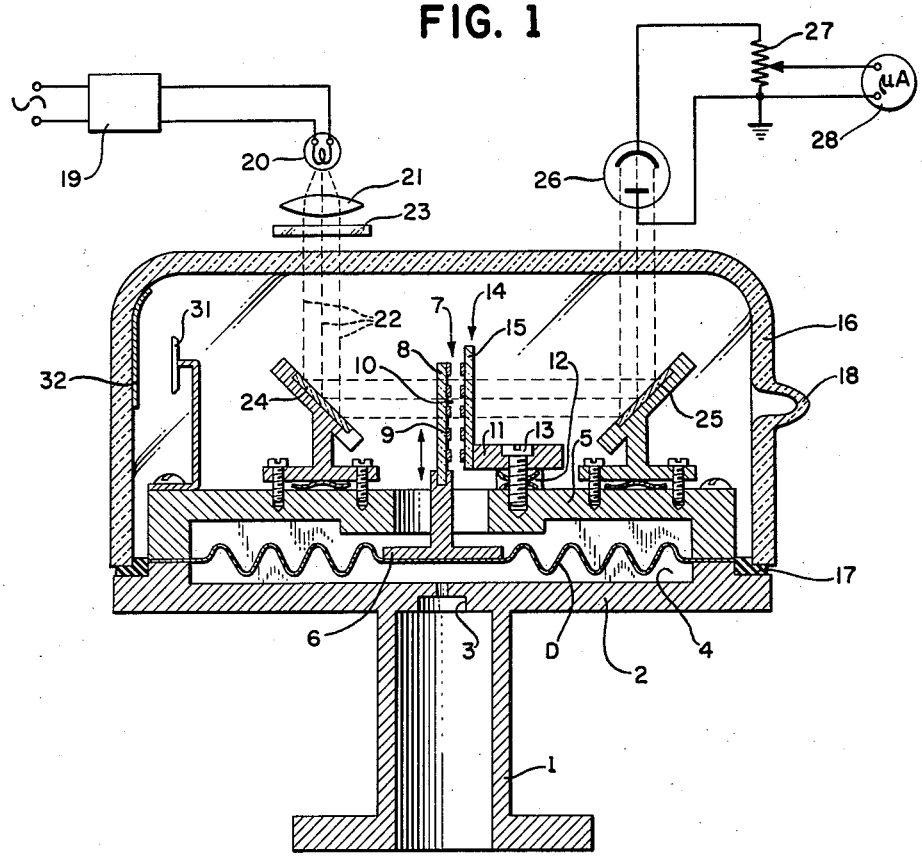

The diaphragm vacuum gauge according to the invention as illustrated in FIGURE 1 is adapted to be connected to the apparatus or vessel containing the vacuum to be measured by means of a connecting socket 1 on a base plate 2 which has a narrow central aperture 3 for the passage of the pressure to the gauge chamber 4 which is closed by a diaphragm D. This diaphragm D is firmly clamped along its outer edge by a flange on a supporting plate 5 and it carries at its center a member 6 of a T-shaped cross section which carries on its upper end a partly transparent screen 7 which extends vertically to the general plane of diaphragm D and may consists, for example, of a glass plate 8 with a series of parallel opaque coating strips 9 thereon which are spaced from each other at uniform distances forming transparent areas 10.

The supporting plate 5 serves as a stop member to limit the movement of diaphragm D in the upward direction by the engagement of the horizontal part of the T-shaped member 6 with the lower surface of plate 5. On its upper side, plate 5 carries a supoprting member 11 the level of which is adjustable by means of a spring 12 and a setscrew 13. Supporting member 11 carries a second screen 14 which extends parallel to screen 7 and may likewise consist of a glass plate 15 with a series of parallel spaced opaque strips thereon. The two screens 7 and 14 are preferably of an identical design, as shown, for example, in FIGURE 2, in which the parallel opaque and transparent stripes 9 and 10 are of the same width so that, when the opaque strips of both screens are disposed at the same levels as shown in FIGURE 1, a maximum amount of light may pass through the corresponding transparent strips 10 of both screens, while when screen 7 is moved parallel to screen 14, different amounts of light may pass through the screens until in one position, the two screens will cover each other completely and allow practically no light to pass therethrough.

The vacuum gauge according to the invention is completely enclosed by a glass bell 16 which is fitted vacuum-tight on base plate 2 by a layer 17 of a suitable cement and is evacuated to a certain vacuum through a nipple 18 which is thereafter fused shut. The gauge according to the invention has therefore the advantage that the vacuum measurement is carried out independently of the outer atmospheric pressure by a comparison between the vacuum in the apparatus or vessel to which the gauge is connected and the standard vacuum in glass bell 16.

The provision of glass bell 16 has the further great advantage that the apparatus and devices for producing and measuring the amount of light passing through screens 7 and 14 may be mounted outside of the vacuum so that for this purpose no electrical conductors have to be passed into the gauge itself.

The apparatus for producing the required light for the vacuum measurement consists of the connecting set 19 which is to be connected to a source of electric current and insures that a constant current and voltage is supplied to a light bulb 20. The light emitting from light bulb 20 passes through a condenser lens 21 so as to produce parallel light beams 22 which, if necessary, may then pass through a light filter 23 so as to alter their speectral composition. The parallel light beams then pass through the glass bell 16 and upon a mirror 24 which deflects the beams 22 so as to extend in a direction parallel to diaphragm D and vertical to the screens 7 and 14. A certain amount of light which depends upon the particular position of screens 7 and 14 relative to each other then passes through the screens and upon a second mirror 25 which deflects the light upwardly and through glass bell 16 upon a photoelectric cell 26. The voltage produced by this cell 26 is then conducted through a potentiometer 27 to an ammeter 28 and is measured thereby on a scale which is calibrated in pressure units. The potentiometer 27 and ammeter 28 may, of course, be replaced by other conventional apparatus for measuring light intensity values.

The extent of the deflection of the diaphragm D depends upon the differential pressure to which the diaphragm is subjected, that is, from the pressure to be measured in the evacuated vessel relative to the pressure existing underneath the glass bell 16. The diaphragms which have so far been employed in the vacuum gauge according to the invention deflect, for example, 0.5 mm. at a pressure of 1 to 20 mm. Hg, depending upon the thickness of the respective diaphragm. Assuming, for example, that the opaque and transparent stripes 9 and 10 of the two screens 7 and 14 are of the same thickness and each transparent stripe and its adjacent opaque stripe which together form one "period" have a combined thickness of 0.5 mm., it is still possible to measure pressures of $10^{-3}$ to $10^{-2}$ mm. Hg, depending upon the sensitivity of the photometer employed.

The vacuum gauge according to the invention is particularly valuable for measuring very low pressures. In order to exclude as much as possible any effects of a variation of the light intensity of light bulb 20 which may occur, for example, by aging of the bulb, it is of a great advantage if the screens are arranged so as to be substantially closed at low pressures rather than at higher pressures, while at the lowest pressure to be measured they are entirely closed so that this value may be accurately determined regardless of any variation of the light intensity of bulb 20. It is thus possible to increase the measuring range of the vacuum gauge in the direction toward low pressures and to determine their value as accurately as possible. In order to avoid any undesired light reflection or stray light, it is also advisable to provide screens 7 and 14 or the glass plates 8 and 15 carrying the same with anti-reflective coatings or to employ other optical means known for this purpose, such as diaphragms, and the like.

Figure 2:
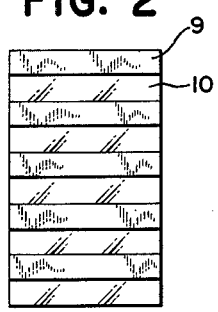
FIGURE 2 shows a front view of a screen.

The screen as illustrated in FIGURE 2 has a periodicity of 1 mm., one half of which is transparent, while the other half is opaque. Within a limited pressure range such a screen produces a substantially linear pressure indication and it is very useful for attaining accurate measurements within this range.

Figure 3:
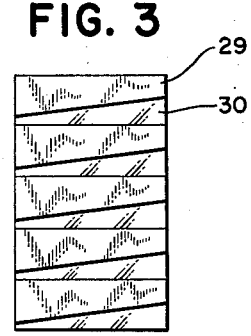
Figure 4:
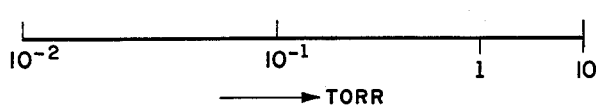
FIGURE 4 shows a nonlinear scale of a photometer indicator which is employed with the apparatus according to the invention.

FIGURE 3 illustrates a screen of the same periodicity of 1 mm. of opaque and transparent stripes 28 and 29, but the transparent stripes 29 are wedge-shaped so as to be considerably narrower at one side which has a width of, for example, 0.1 mm. than at the other side which has a width of 0.5 mm. Such screens produce a pressure indication within larger pressure ranges. The amount of light passing through these wedge-shaped screens is no longer proportional to the deflection of diaphragm D but it increases gradually. The scale of the photometer indicator 28 is then nonlinear, as illustrated in FIGURE 4, and it permits a supervision within several pressure decades. This screen shape according to FIGURE 3 which may also be combined with a screen of the shape according to FIGURE 2 is therefore especially of advantage when applying a recording apparatus which will then furnish a continuous pressure curve, and also for starting any conventional pressure regulating, control, and safety apparatus as are now frequently used in connection with vacuum apparatus.

In order to maintain within the vacuum gauge, that is, within the glass bell 16, the lowest possible pressure for a long time, a getter device may be provided therein which consists of a getter support 31 which may be heated, for example, in the conventional manner by induction, so as to vaporize the getter material, for example, barium metal, and to form a deposit 32 on the inner wall of glass bell 16.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A diaphragm vacuum gauge comprising a cup-shaped supporting base having an aperture and adapted to be connected to a vessel the pressure in which is to be measured, a diaphragm secured to the rim of said base and with said base enclosing a chamber adapted to communicate through said aperture with the inside of said vessel, a supporting member mounted on said base outside of said chamber, a screen mounted in a fixed position on said supporting member, a second screen rigidly connected to said diaphragm so as to be movable therewith and extending vertically to said diaphragm and parallel to said fixed screen so as to be movable parallel thereto, each of said screens having a plurality of alternating opaque and transparent areas, said opaque areas of one of said screens adapted in one position of said movable screen to be disposed in positions different from the positions of the opaque areas of the other screen so as completely to cover the transparent areas of the other screen, while in another position of said movable screen said opaque areas of both screens are disposed in corresponding positions so as to permit a maximum amount of light to pass through said screens, a glass cover secured to said base and completely enclosing said screens and forming an evacuated chamber, a constant light source and optical means mounted in a fixed position outside of said glass cover and adapted to project light beams through said cover and through said transparent areas of said screens, and means also mounted outside of said cover for measuring the light intensity of said beams passing through said screens and then again through said cover.

2. A diaphragm vacuum gauge comprising a cup-shaped supporting base having a aperture and adapted to be connected to a vessel the pressure in which is to be measured, a diaphragm secured to the rim of said base and with said base enclosing a chamber adapted to communicate through said aperture with the inside of said vessel, a supporting member mounted on said base outside of said chamber, a screen mounted in a fixed position on said supporting member, a second screen rigidly connected to said diaphragm so as to be movable therewith and extending vertically to said diaphragm and parallel to said fixed screen so as to be movable parallel thereto, each of said screens having a plurality of alternating opaque and transparent areas, said opaque areas of one of said screens adapted in one position of said movable screen to be disposed in positions different from the positions of the opaque areas of the other screen so as completely to cover the transparent areas of the other screen, while in another position of said movable screen said opaque areas of both screens are disposed in corresponding positions so as to permit a maximum amount of light to pass through said screens, a glass cover secured to said base and completely enclosing said screens and forming an evacuated chamber, a constant light source and optical means mounted in a fixed position outside of said glass cover and adapted to project light beams through said cover and through said transparent areas of said screens, and getter means within said cover for maintaining the vacuum therein.

References Cited in the file of this patent

UNITED STATES PATENTS 2,831,340     Crandall et al. _____ Apr. 22, 1958

FOREIGN PATENTS 1,028,355     France _____ May 21, 1953
1,024,266     Germany _____ Feb. 13, 1958